US008688728B2

(12) United States Patent
Wilkinson

(10) Patent No.: US 8,688,728 B2
(45) Date of Patent: Apr. 1, 2014

(54) SYSTEM AND METHOD OF SEARCHING A CORPUS

(75) Inventor: William K. Wilkinson, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/406,090

(22) Filed: Feb. 27, 2012

(65) Prior Publication Data

US 2013/0226939 A1 Aug. 29, 2013

(51) Int. Cl.
*G06F 17/30* (2006.01)
(52) U.S. Cl.
CPC .................. *G06F 17/30648* (2013.01)
USPC .......................................... 707/767; 707/775
(58) Field of Classification Search
None
See application file for complete search history.

(56) References Cited

U.S. PATENT DOCUMENTS

| 5,062,074 | A | * | 10/1991 | Kleinberger | 1/1 |
| 5,442,778 | A | | 8/1995 | Pedersen et al. | |
| 7,668,887 | B2 | | 2/2010 | Vella | |
| 2002/0194166 | A1 | * | 12/2002 | Fowler | 707/3 |
| 2007/0073719 | A1 | | 3/2007 | Ramer et al. | |
| 2008/0071744 | A1 | * | 3/2008 | Yom-Tov | 707/3 |
| 2009/0100022 | A1 | * | 4/2009 | Nayak et al. | 707/3 |
| 2009/0307209 | A1 | * | 12/2009 | Carmel et al. | 707/5 |
| 2010/0281036 | A1 | * | 11/2010 | Inoue et al. | 707/749 |
| 2010/0306206 | A1 | | 12/2010 | Brassil et al. | |

FOREIGN PATENT DOCUMENTS

CN 101216836 A 7/2008

\* cited by examiner

*Primary Examiner* — Alex Gofman
*Assistant Examiner* — Umar Mian

(57) ABSTRACT

A search method includes the step of creating a list of candidate probe words. For each candidate probe word, the number of item descriptions that contain the candidate probe word is counted. Q probe words are chosen whose word count most equally divides the number of remaining item descriptions into q+1 subgroups. The q probe words are presented for selection. Based on the selection, the list of probe words is pruned to eliminate items that that were not selected. The counting step, choosing step, presenting step and pruning step are repeated until a final list of items remain.

18 Claims, 6 Drawing Sheets

| aabb | 39 |
| adbc | 157 |
| bbcc | 342 |
| aabc | 6 |
| aabc | 98 |
| ⋮ | |
| zzww | 210 |
| zzyy | 83 |

SYSTEM AND METHOD OF SEARCHING A CORPUS

BACKGROUND

Many electronic devices provide a large number of applications that are available for use or for optional downloading for execution on the device. Being able to find an application that has a desired functionality within the large number of applications available can be a difficult and cumbersome process. One approach is to present the applications as a long list perhaps ordered alphabetically by application name and have the user scroll through the list. Another approach allows users to supply their own keywords to search the list of application descriptions. The device returns applications whose descriptions include one or more of the user's keywords. Another approach is to hierarchically organize the applications using some taxonomy and have the user navigate a path through the taxonomy to find the desired application.

BRIEF DESCRIPTION OF DRAWINGS

The figures depict implementations/embodiments of the invention and not the invention itself. Some embodiments are described, by way of example, with respect to the following Figures.

The drawings referred to in this Brief Description should not be understood as being drawn to scale unless specifically noted.

DETAILED DESCRIPTION OF THE EMBODIMENTS

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. Also, different embodiments may be used together. In some instances, well known methods and structures have not been described in detail so as not to unnecessarily obscure the description of the embodiments.

Finding an application having a specific desired functionality from a large corpus of available applications can be a difficult task. The described system and method take a different approach as compared to the other search methodologies. Instead of the user entering a list of keywords, the described system presents the user of an electronic device with a short list of probe words that appear in or are relevant to the application descriptions. These probe words are carefully chosen to partition the set of applications into disjoint subsets. The user selects the probe words that describe or are associated with the desired application functionality. Applications whose descriptions do not include the selected words are then eliminated from consideration and another set of probe words is generated from the remaining application descriptions and presented to the user. This process iterates until a reasonably small set of applications remains.

Figure 1:
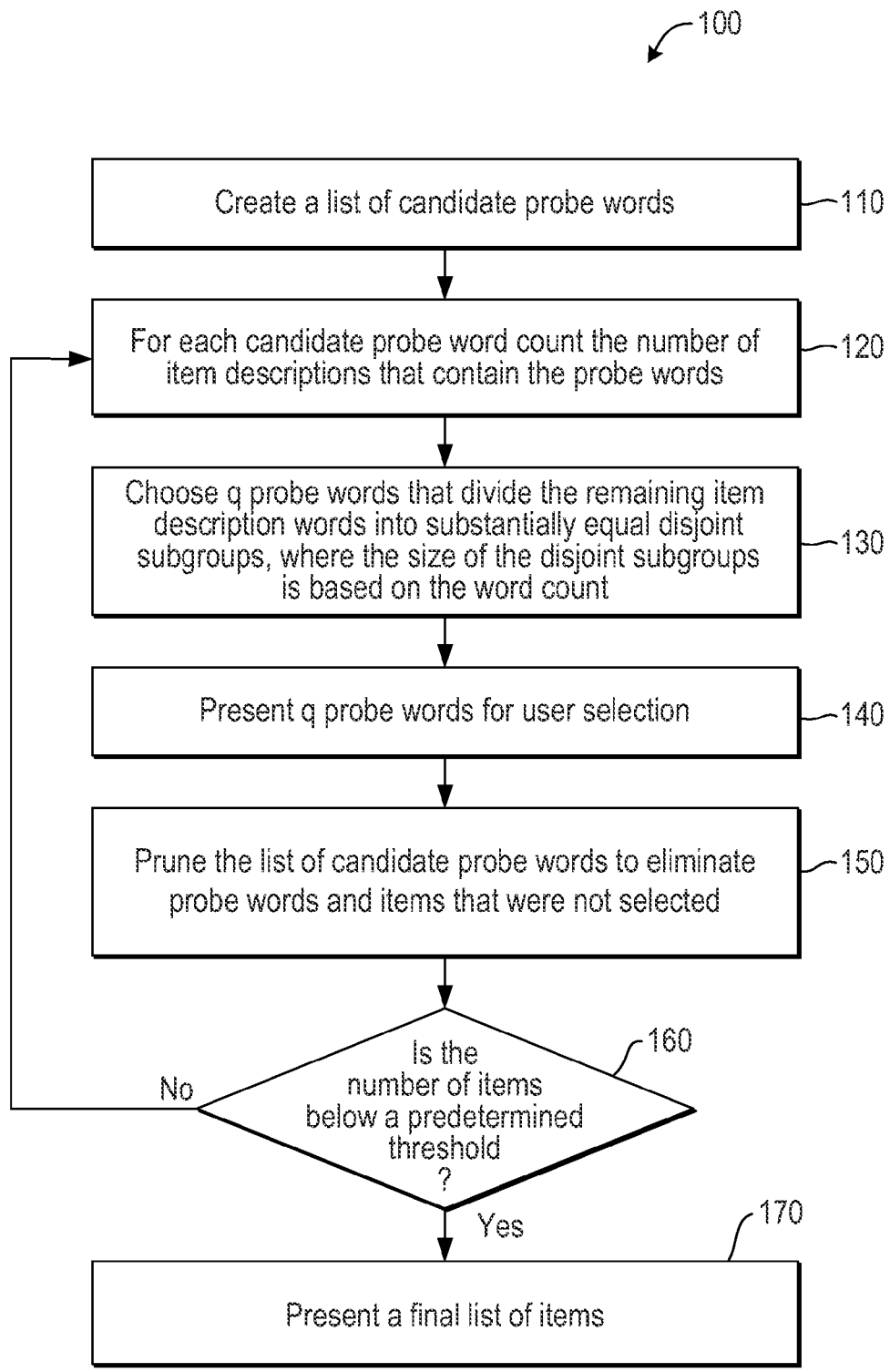
FIG. 1 shows a flow diagram for a method of searching a corpus using probe words that partition the search space according to an example of the invention.

Referring to FIG. 1, a method for assisting a user in iteratively searching a corpus using probe words that partition the search space into disjoint subgroups is shown. The method 100 of searching a corpus, comprising the steps of: creating a list of candidate probe words (step 110); for each candidate probe word, counting the number of item descriptions that contain the candidate probe word (step 120); choosing q probe words that divide the number of remaining item descriptions into q+1 substantially equal sized disjoint subgroups, where the size of the disjoint subgroups is based on the word count (step 130); presenting q probe words for user selection (step 140); pruning the list of words to eliminate items that included the probe words that were not selected (step 150); and repeating the counting step, choosing step, presenting step and pruning steps until the number of items remaining falls below some threshold (step 160).

For some large, difficult-to-manage lists, trying to browse thru all of items listed can be tedious and time consuming. It may not be efficient to go thru the large list alphabetically or even using a keyword search. For example, some keywords aren't very selective and the user might still end up with a large, unmanageable list. In the proposed system, computer generated probe words are generated that are efficient in narrowing down the list down to a more manageable list of items (in one example, applications.) Instead of the user coming up with the keywords, the system determines the most efficient words for searching the corpus. The user gives feedback by choosing the most relevant probe words.

The system probes the user—presenting different sets of probe words to the user and then observes the user's response is. Then based on the user's response to the presented probe words, the system refines the list of candidate probe words and then generates a new set of probe words for presentation to the user. The list gets smaller and smaller and smaller and eventually—a probe word (or small list of probe words) is presented that satisfies the user's requirements.

The described method assists the user in rapidly searching a large set of descriptions. The user does not need to generate keywords for use in the search which can be inefficiently chosen. Instead, probe words are generated by the system in an optimal way that quickly reduces the search corpus. The technique is dynamic and adapts as descriptions are added to or removed from the collection.

Referring to FIG. 1 shows a flow diagram for a method of searching a corpus using probe words that partition the search space according to an example of the invention. The first step in the search method is creating a list of candidate probe words (step 110). The list of candidate probe words is generated from the item descriptions. For purposes of discussion, in one implementation the "items" that are searched are applications. However, items other than applications (i.e. price, colors, photographs, etc.) may be searched using the described methods.

In one example, the items searched are application. For this case, the application description is a word or list of words associated with the applications being searched (the search space). Each application has an application description associated with it. For example, the application description might be as simple as the name or title of the application. In another example, the application description might include the title and a description of the application (i.e. function) it is associated with. In another example, the application descriptions might include the title of the application and taxonomy information.

Figures 2A, 2B:
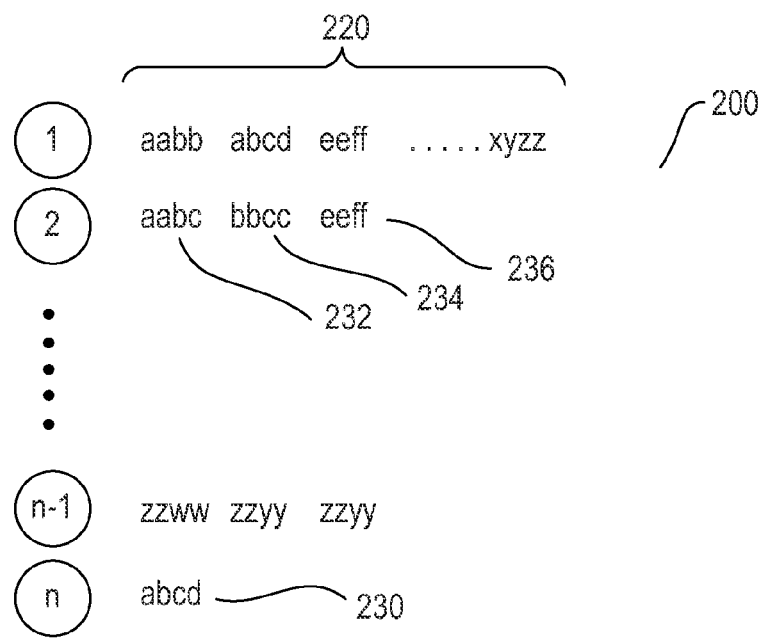
FIG. 2A shows an example of a list of candidate probe words for a corresponding list of applications according to an example of the invention.
FIG. 2B shows an example of a list of candidate probe words and their associated word count according to an example of the invention.

FIG. 2A shows an example of a list of candidate probe words for a corresponding list of applications according to an example of the invention. Referring to the list 200 in FIG. 2A, the numbers 1 thru n are representative of the n applications. Each of the n applications has an application description 220 associated with it. The application description can consist of a single word (see for example word 230 associated with application n). Alternatively, the application description can consist of multiple words (see for example words 232, 234, 236 associated with application 2).

Referring to FIG. 1, a step in the described search method is creating a list of candidate words (step 110). In one example, the creation of the candidate probe word list includes the step of further limiting the candidate probe word list by eliminating any noise words. Noise words are words that provide little information content e.g. articles, pronouns, prepositions, auxiliary words, conjunctions, etc. Because noise words provide little information content, they are generally not useful with regards to efficiently partition the search space.

In another example, the initial list of candidate probe words can optionally be further limited by including a normalization step (i.e. such as de-steming the candidate word list.) Normalization of the candidate list of probe words eliminates words which are effectively candidate word duplicates (i.e. run/runs/running or game/games) by simplifying to a root word. For example, going to the infinitive form of the verb or eliminating plural forms of the word—both methods of achieving a unique form of all the candidate words are both examples of normalization.

Referring to FIG. 1, after a candidate list of probe words W is created (step 110), a word count of the candidate probe words is performed. The number of application descriptions that contain each candidate word is determined. Let W denote the set of all candidate probe words. Then for each word w in W, the number of application descriptions that contain each word w is counted (step 120). Further, $D_1$ denotes the initial set of all application descriptions and $D_i$ denotes the set of all application descriptions for the ith iteration of the method.

FIG. 2A shows an example of a list of candidate probe words for a corresponding list of applications according to an example of the invention. FIG. 2B shows an example of a list of candidate probe words and their associated word count according to an example of the invention. Referring to FIG. 2B shows a word count for a list of words w. Each possible probe word in the application description has a word count associated with it. For the example shown in FIG. 23, the word "aabb" has a word count 39 associated with it. Similarly, the word "adbc" has a word count 157 associated with it.

The word count in the table shown in FIG. 23 is incremented when a word occurs in the application description. For example, referring to FIGS. 2A and 2B, assume the word count table in FIG. 2A has been tabulated just before counting applications n-1 and application n. Application n-1 has three words associated with it in the application description. The count for word "zzww" would be incremented by one, from 210 to 211. However, one of the words "zzyy" occurs twice in the same application description. In one example, the described method would count the word "zzyy" only once (once the first time the word appears in the application description.) Thus, the count for word "zzyy" would only be incremented once—from 83 to 84. Application n has a single word in its application description "abcd." After the application n is counted, the word count for "abcd" (not shown in FIG. 2B) would be incremented by one.

Let $P_i$ denote the set of probe words presented to the user for the ith iteration of the described method. Then $P_1$ denote the initial probe words. Assuming that there are q probe words in each iteration, then $|P_i|=q$. Referring to FIG. 1, the described method also includes the step of choosing q probe words from the list of candidate probe words whose word count most equally divides the number of remaining application descriptions into q+1 disjoint subgroups. Partitioning the descriptions into q+1 different subgroups is based in part on the idea of presenting to the user what is considered to be a reasonable number (q) probe words for review. Choosing the probe words having word counts that are relatively the same count in size, i.e., that create equal sized partitions, is implemented because it is seen as an efficient search strategy.

Let $D_1$ denote the initial set of all application descriptions and Di denote the set for the ith iteration of the algorithm. Let $W_1$ denote the initial set of all candidate probe words. Let $W_i$ denote the set of candidate probe words for the ith iteration of the algorithm. Let $P_1$ denote the initial probe words and $P_i$ denote the set of probe words for the ith iteration of the algorithm. Assume that there are q probe words in each iteration, i.e. $|P_i|=q$.

After generating the candidate words, each iteration of the described method proceeds as follows. For each word w in $W_i$, the number of item descriptions in $D_i$ that contain each probe word w is counted (step 120). Then the probe words whose word count most equally divides the remaining application description words into q+1 disjoint subgroups is chosen (step 130). Each of the q subgroups has application descriptions containing one of q probe words. The remaining subgroup has application descriptions that contain no probe words and this subgroup represents "none of the above", i.e., the case that no probe words are selected. In one example, the method used for determining the q probe words whose word count most equally divides the remaining application description words into q+1 disjoint subgroups is implemented by choosing the probe word whose count is closest to $|D_i|/(q+1)$ for each iteration i (see step 310 in FIG. 3, for example). Although different implementations are possible, the implementation by choosing the probe group whose count is closet to $|D_i|/(q+1)$ is shown in FIG. 3.

Figure 3:
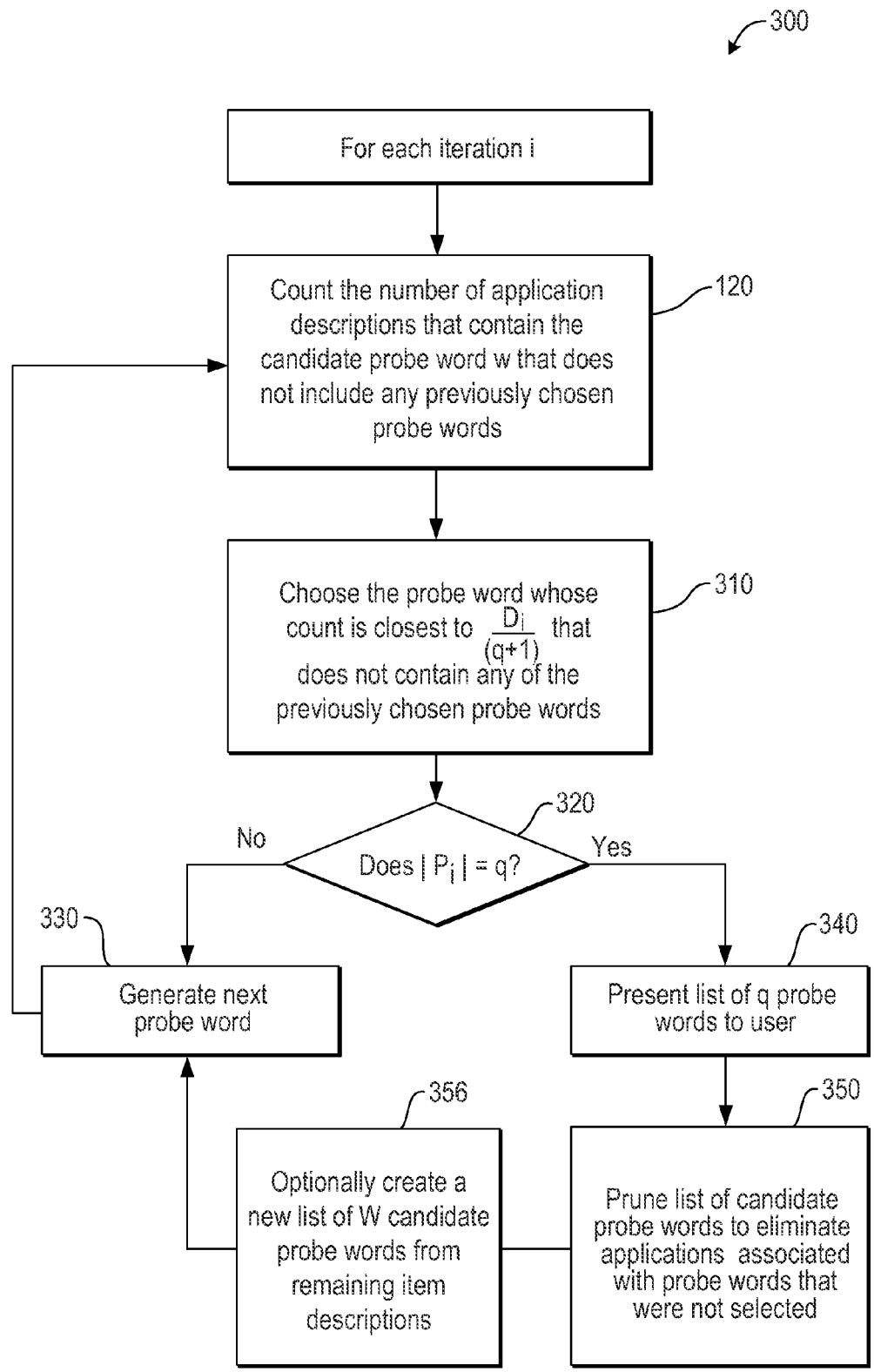
FIG. 3 shows a flow diagram of the step of choosing q probe words whose count divides the remaining groups of descriptions into q+1 disjoint subgroups according to an example of the invention.

Referring to FIGS. 1 and 3, each iteration of the described method counts the number of remaining application descriptions. A new set of candidate probe words, $W_i$, is generated from the descriptions Di of the remaining applications. Note that this is an optimization step and without loss of correctness, but with a loss of efficiency the same set of candidate probe words W could be used for each iteration of the algorithm. For each word w in $W_i$, the number of application descriptions in $D_i$ that contain the word w is counted (step 120). For the implementation shown in FIG. 3, the probe word whose word count is closest to $|D_i|/(q+1)$ is chosen (step 310). In the first iteration (for the initial probe word in the subgroup), there are no previously chosen probe words that were chosen in the subgroup for presentation—so the method does not need to consider counts associated with any previously chosen probe words. For purposes of example, say that there are 1200 application descriptions and we are going to present five (q=5) probe words per search. For this case, we would seek a candidate probe word that is the nearest to 200—a probe word that appears in 200 applications.

In one example, the number of probe words is then checked to see if it is equal to q—the number of candidate probe words to be presented to the user. If $|P_i|$ is not equal to q (step 320), then we need to generate at least an additional probe word—before presenting the list of q probe words to the user. To get the next probe word (the second probe word assuming q is greater than one), then we count the number of applications that contain the candidate probe words and that do not include any previously selected probe words. Thus to get the second probe word $p_2$, for each word w in W, we count the number of application descriptions that contain the word w and that do not contain any previously selected probe words ($p_1$ for this example.) The next probe word selected is the probe word whose count is closest to $|D_i|/(q+1)$ (step 310). The remaining probe words are chosen similarly—until we have partitioned the $D_i$ application descriptions into (q+1) subsets where q of the subsets are application description words that contain one of the probe words and the remaining subset (the +1 group) is a subset that contains none of the q probe words.)

In the example shown with respect to FIG. 3, the items searched are applications and the candidate probe words are generated from the application descriptions. However, items other than applications (i.e. retail items, photographs, etc.) may be searched and candidate probe words can be generated from their item descriptions. For example, photograph description words may be associated with a photograph collection where each photograph has an item description associated with it. In this case, a count of the photograph description words may be used to search through photograph collections.

In another example, words associated a retail item may be searched. Ire one example, the candidate word could be limited to not all of the words associated with the item descriptions of the retail items, but a subset of the item descriptions. For example, the candidate words could be limited to all of the "color" words descriptions. In this case, the count would not be a count of each word in the entire retail description of a particular item—but instead would be limited only to words in the retail description that are "color" words—words associated with color (i.e., blue, fuschia, etc.)

In another implementation, the candidate words associated with an item could be values or a range of values. In this case, items having a particular value or range of values could be counted. For examples, items having the value of $5.00 or alternatively values described by the descriptive word five dollars would be counted. Alternatively, a range of values could be counted. For example, retail items having a value in the range between $1 (one dollar) to $20 (twenty dollars) could be representative of one candidate probe word and retail items priced between the value $21 (twenty one dollars) and $40 (forty dollars) could be representative of a second candidate probe word.

In one example, the item description that is measured or counted is changed with each iteration of the method. For example, in one implementation with retail items, in one iteration q probe words related to color would be presented and in a second iteration q probe words related to price would be presented.

The goal of the method is to find a metric (e.g. a word count) that varies with an item description (e.g. an application description.) The metric is used to measure the size of partitions (i.e. count of each candidate word) and to rank the partitions (subsets). The partitions associated with the probe words are the partitions which do the best job of partitioning the corpus. In one example, the best job of partitioning the corpus is determined to be the partitioning which most equally divides the corpus according to the metric in relatively equal sized subgroups.

The described method presents q probe words to the user for possible selection (step 330). If the method has reached the qth iteration (q probe words chosen), then the list of q probe words is presented to the user (step 340). A user will respond to the list of q probe words by selecting the probe words associated with the applications of interest. After the user selects the probe words of interest, the selection information is used to determine how to prune the remaining applications. Based on the user selection, the list of applications is pruned to eliminate the applications associated with the probe words that were not selected (step 350). Note that it is possible that no probe words are selected by the user which is why there is one partition of applications whose descriptions contain no probe words.

In one example, a new list W of candidate probe words is created from the remaining item descriptions (step 356). This step is optional and improves the efficiency of the method by eliminating candidate probe words that do not occur in descriptions of the remaining applications. A new list of candidate probe words $W_i$ is generated from the descriptions of the remaining applications. In other words, $D_i$ is pruned by eliminating subsets for unselected probe words. Each time new probe words are presented to the user, the selected probe words are used to prune the candidate list of applications to smaller and smaller sets.

Figure 4A:
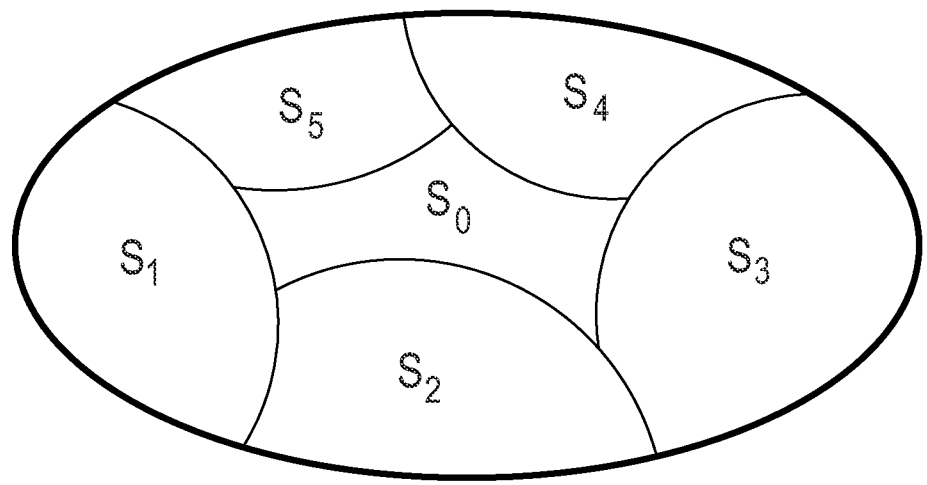
FIG. 4A shows a diagram of the different disjoint subgroups after choosing q+1 disjoint subgroups according to an example of the invention.

The described method attempts to efficiently divide the search corpus. In one example, the search method chooses application subgroups that equally divide the remaining applications based on word count. Referring to FIG. 4A shows a diagram of q+1 disjoint subgroups after implementation of the search method according to an example of the invention. Although just an example, the drawing shown in FIG. 4A is meant to illustrate the approximately equal subgroups $S_0$-$S_5$. The subgroup $S_o$ represents those applications that have none of the probe words in its application description. The subgroup $S_0$ in FIG. 4A, represents the "+1" number in the formula $|Di|/(q+1)$.

Figure 4B:
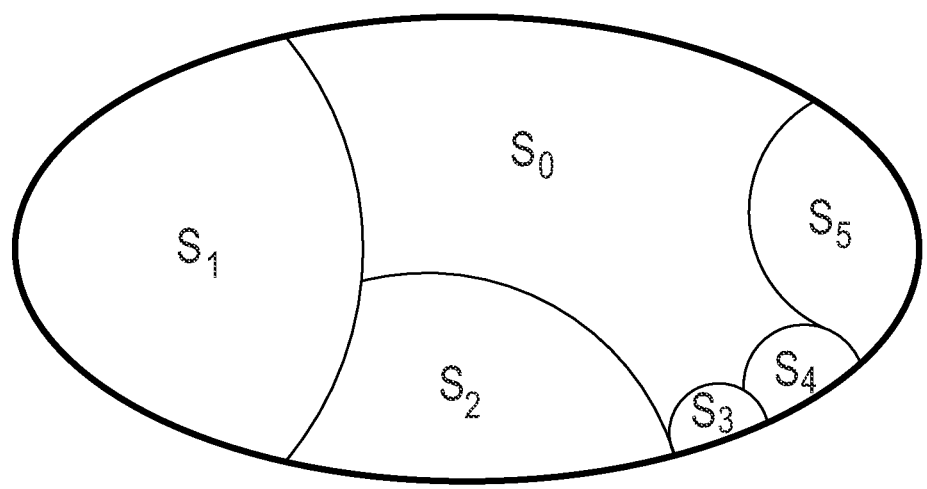
FIG. 4B shows a diagram of the different disjoint subgroups after choosing the disjoint subgroups when the method of the present invention is not used.

Referring to FIG. 4B illustrates a diagram of q+1 subgroups where the disjoint subgroups are not substantially equal in their count. The division is FIG. 4B does not provide q+1 subgroups of approximately equal size. Instead the subgroups $S_0$-$S_5$ are of widely varying size. Generally, the widely varying sizes do not provide an efficient search of the corpus compared to the more equally sized subgroups $S_0$-$S_5$ shown in FIG. 4A.

The described method can enable a user to find an application more quickly than scrolling through a serial list of applications. Compared to the user-provided keyword search, the described method can be faster because the probe words presented to the user are specifically chosen to reduce the search space quickly. The described system and method also saves the user from having to create keywords and to type them which may be tedious for devices (i.e. mobile devices) with small or slow keyword entry. Compared to a taxonomic search, the described approach adapts easily to dynamic content. Also, a taxonomy may have to be modified as the descriptions change or descriptions are added or removed. And, a taxonomy may not efficiently partition the set of items to be searched, e.g., compare FIG. 4B rather than 4A.

The general search technique described can be used to search any large corpus of items that have a description associated with each item. For example, instead of searching applications, the search method could search a large corpus of photographs that have a word description associated with it. In addition, the general search technique described can be used in combination with other search methodologies. For example, part of an application taxonomy could be games—which could have an extremely large corpus (a large number of games) associated with it. The described method could be used for searching the game applications.

Referring to FIG. 3, the probe words are presented to the user who selects probe words that are associated with the application of interest (step 340). $D_i$ is then pruned by eliminating subsets for unselected probe words and the remaining subsets become $D_{i+1}$. The process continues until the number of candidate applications is sufficiently small for presentation to the user.

Referring to FIG. 1, the counting step (step 120), the choosing step (step 130), the presenting step (step 140) and the pruning steps (step 150) are repeated until a predetermined item threshold is reached (step 160). In one example, the predetermined item threshold is a number of final items to be presented to the user. For example, for the case where the items are applications—if m is a number of applications considered to be a reasonable number to present to the user for selection, when the number of applications reaches a number less than or equal to m—the list of applications will be presented to the user.

Figure 5:
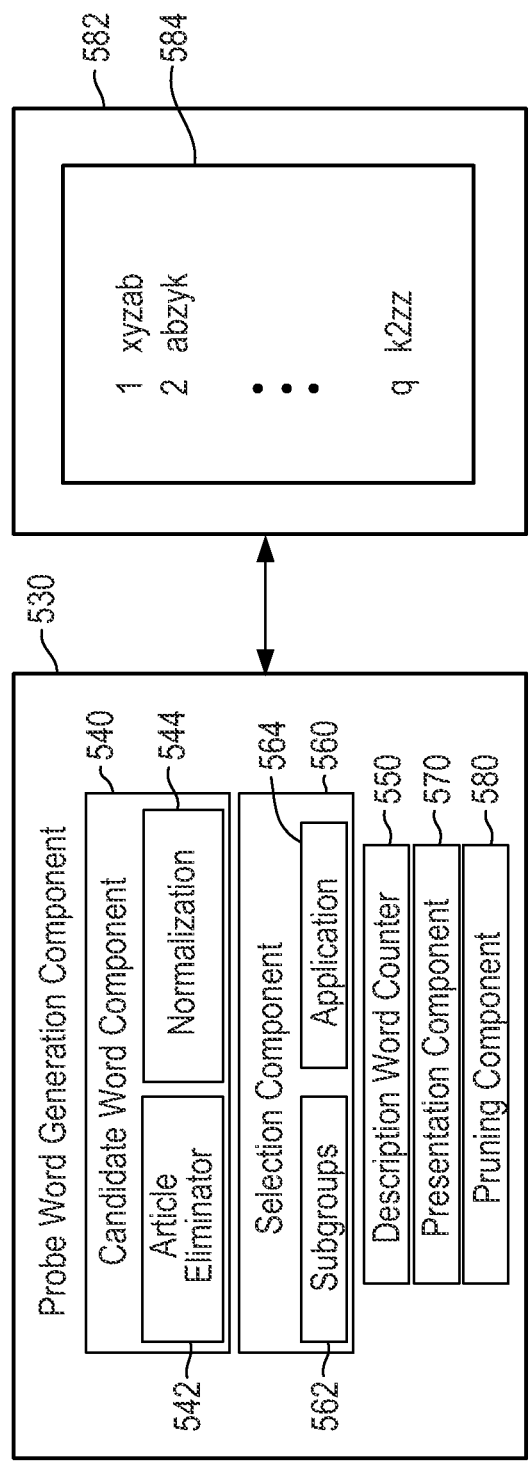
FIG. 5 shows a system for searching a corpus according to an embodiment of the invention.

FIG. 5 shows a computer system for implementing the methods shown in FIGS. 1 and 3 and described in accordance with the examples herein. In one example, the method described is implemented using a probe word generation system 530. The probe word generation system 530 includes a candidate word component 540. The candidate word component 540 takes the application word descriptions and generates a candidate word list. Optionally, the candidate word component reduces the candidate word list by eliminating articles (article eliminator component 542) or by normalizing the candidate word list (normalization component).

The probe word generation component further includes a description word counter 550 which for each candidate probe word, counts the number of application descriptions. The selection component 560, selects from the list of candidate probe words—probe words whose count substantially divides the remaining application words into q+1 disjoint subgroups. After q probe word are selected, the probe words are presented to the user for selection. The presentation of the probe words is controlled by a presentation component 570.

Referring to FIG. 5 shows a probe word generation component communicatively coupled to the display 584 of an electronic device 582. In one example, the q probe words are displayed on the display 584 of an electronic device for user selection. The user selects the most relevant probe words and based on the user selection—some probe words and applications associated with those probe words may be eliminated. The elimination of the appropriate probe words and application is performed by the pruning component 580.

Figure 6:
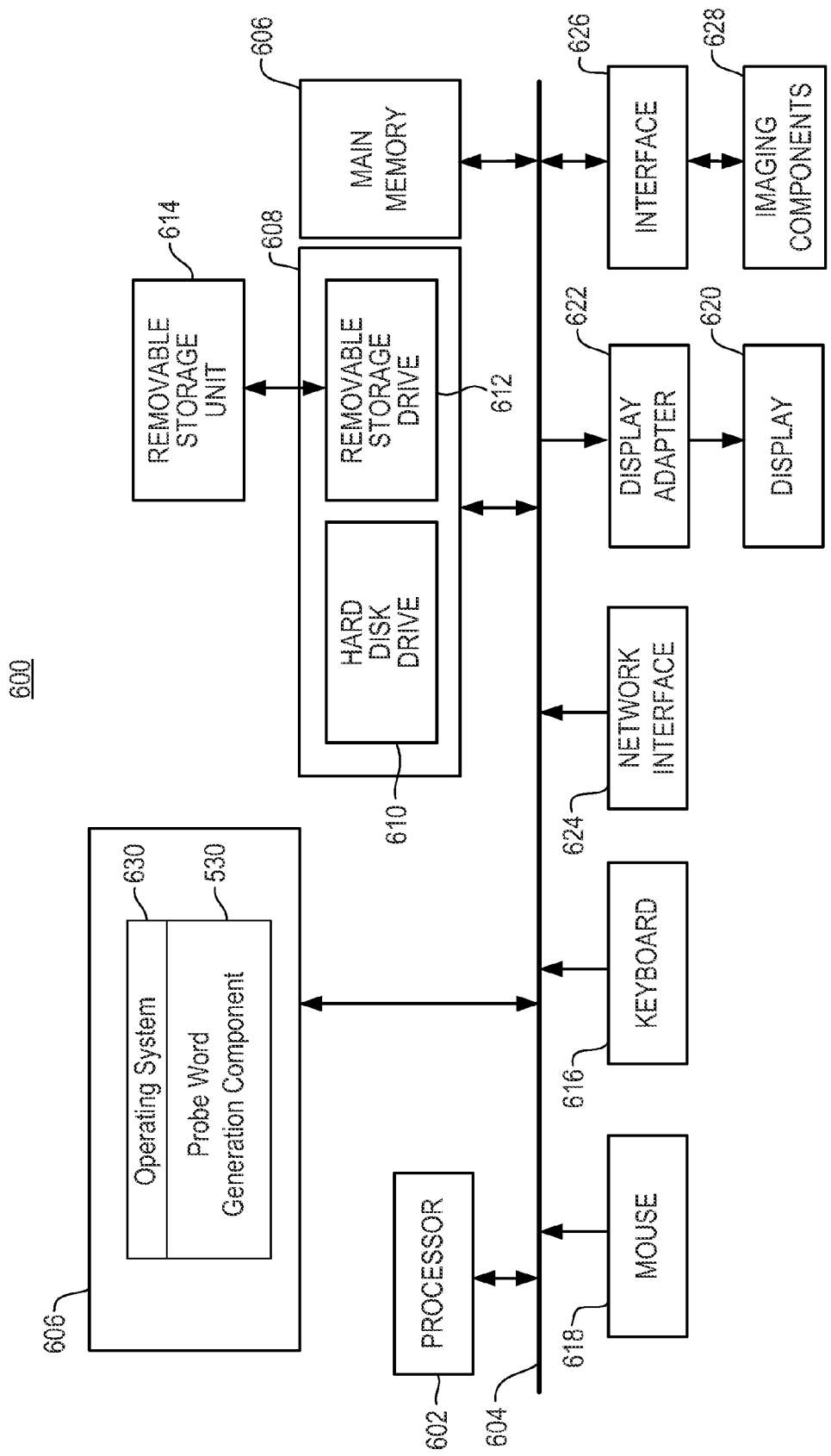
FIG. 6 shows a computer system for implementing the methods shown in FIGS. 1 and 3 and described in accordance with examples of the present invention.

Referring to FIG. 6, in one example the computing apparatus 600 includes one or more processor(s) 602 that may implement or execute some or all of the steps described in the methods 100 and 300. Commands and data from the processor 602 are communicated over a communication bus 604. The computing apparatus 600 also includes a main memory 606, such as a random access memory (RAM), where the program code for the processor 602, may be executed during runtime, and a secondary memory 608. The secondary memory 608 includes, for example, one or more hard drives 610 and/or a removable storage drive 612, representing a removable flash memory card, etc., where a copy of the program code for the methods 100, 300 may be stored. The removable storage drive 612 reads from and/or writes to a removable storage unit 614 in a well-known manner.

These methods, functions and other steps described may be embodied as machine readable instructions stored on one or more computer readable mediums, which may be non-transitory. Exemplary non-transitory computer readable storage devices that may be used to implement the present invention include but are not limited to conventional computer system RAM, ROM, EPROM, EEPROM and magnetic or optical disks or tapes. Concrete examples of the foregoing include distribution of the programs on a CD ROM or via Internet download. In a sense, the Internet itself is a computer readable medium. The same is true of computer networks in general. It is therefore to be understood that any interfacing device and/or system capable of executing the functions of the above-described examples are encompassed by the present invention.

Although shown stored on main memory 606, any of the memory components described 606, 608, 614 may also store an operating system 630, such as Mac OS, MS Windows, Unix, or Linux; network applications 632; and a display controller component 630. The operating system 630 may be multi-participant, multiprocessing, multitasking, multi-threading, real-time and the like. The operating system 630 may also perform basic tasks such as recognizing input from input devices, such as a keyboard or a keypad; sending output to the display 620; controlling peripheral devices, such as disk drives, printers, image capture device; and managing traffic on the one or more buses 604. The network applications 632 includes various components for establishing and maintaining network connections, such as software for implementing communication protocols including TCP/IP, HTTP, Ethernet, USB, and FireWire.

The computing apparatus 600 may also include an input devices 616, such as a keyboard, a keypad, functional keys, etc., a pointing device, such as a tracking ball, cursors, mouse 618, etc., and a display(s) 620. A display adaptor 622 may interface with the communication bus 604 and the display 620 and may receive display data from the processor 602 and convert the display data into display commands for the display 620.

The processor(s) 602 may communicate over a network, for instance, a cellular network, the Internet, LAN, etc., through one or more network interfaces 624 such as a Local Area Network LAN, a wireless 402.11×LAN, a 3G mobile WAN or a WiMax WAN. In addition, an interface 626 may be used to receive an image or sequence of images from imaging components 628, such as the image capture device.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

It is intended that the scope of the invention be defined by the following claims and their equivalents:

What is claimed is:

1. A search method comprising:
   creating a list of candidate probe words;
   for each candidate probe word, counting a number of item descriptions that contain the candidate probe word;
   choosing, with a computer, $q_i$ probe words from the candidate probe words whose word count is closest to $|D_i|/(q_i+1)$, where $D_i$ is a set of remaining item descriptions after a previous repetition, and $q_i$ represents a number of probe words presented for user selection for the ith repetition and is an integer greater than 1;
   presenting the $q_i$ probe words for selection by the user;
   receiving a selection of one of the $q_i$ probe words by the user;
   pruning the list of candidate probe words to eliminate item descriptions that include non-selected ones of the $q_i$ probe words to create a pruned list of candidate probe words;
   choosing $q_{i+1}$ probe words from the pruned list of candidate probe words that is closest to $|D_{i+1}|/(q_{i+1}+1)$, wherein $D_{i+1}$ is a set of remaining item descriptions after the ith repetition, $q_{i+1}$ represents a number of probe words presented for user selection for the i+1 repetition and is an integer greater than 1, and the pruned list of candidate probe words includes the selected one of the $q_i$ probe words; and
   presenting the $q_{i+1}$ probe words for selection by the user.

2. The method recited in claim 1, further including creating a new list of candidate probe words from the remaining item descriptions after the ith repetition wherein creating the new list of candidate probe words is performed after pruning the list of candidate probe words.

3. The method recited in claim 1, further including presenting a final list of items for user selection.

4. The method recited in claim 1, wherein:
   the word count of the $q_i$ probe words most equally divides the number of remaining item descriptions after the previous repetition into $q_i+1$ subgroups; and
   the $q_i+1$ subgroups are disjoint subgroups.

5. The method recited in claim 1, wherein the item descriptions are capable of being changed with each repetition.

6. The method recited in claim 1, wherein creating the list of candidate probe words further includes eliminating any noise words from the list of candidate probe words and normalizing the list of candidate probe words.

7. A non-transitory computer readable storage medium having computer readable program instructions stored thereon for causing a computer system to perform instructions, the instructions comprising the steps of:
   creating a list of candidate probe words;
   for each candidate probe word, counting a number of application descriptions that contain the candidate probe word;
   choosing q probe words from the candidate probe words whose word count is closest to $|D_i|/(q+1)$, where $D_i$ is a set of remaining application descriptions for an ith repetition, and q is a number of probe words presented for user selection and is an integer greater than 1;
   presenting the q probe words for user selection;
   pruning the list of candidate probe words to eliminate application descriptions that include non-selected ones of the q probe words to create a pruned list of candidate probe words, wherein the pruned list of candidate probe words includes a probe word selected by the user from the q probe words; and
   repeating counting the number of application descriptions, choosing q probe words from the pruned list of candidate probe words, presenting the q probe words for selection and pruning the list of probe words until a final list of applications remain.

8. The non-transitory computer readable storage medium having computer readable program instructions recited in claim 7, the instructions further comprising presenting the final list of remaining applications.

9. The non-transitory computer readable storage medium having computer readable program instructions recited in claim 7, the instructions further comprising creating a new list of candidate probe words from the remaining item descriptions wherein the step of creating a new list of candidate probe words is performed after the pruning step.

10. The non-transitory computer readable storage medium having computer readable program instructions recited in claim 7, the instructions further comprising presenting the final list of applications for user selection.

11. The non-transitory computer readable storage medium having computer readable program instructions recited in claim 7, wherein q+1 subgroups are disjoint subgroups.

12. The non-transitory computer readable storage medium having computer readable program instructions recited in claim 8, wherein the application descriptions are capable of being changed with each repetition.

13. The non-transitory computer readable storage medium having computer readable program instructions recited in claim 7, wherein creating a list of candidate probe words further includes the steps of eliminating any noise words from the list of candidate probe words and normalizing the list of candidate probe words.

14. A computer hardware system for generating probe words comprising:
   a candidate word component for generating a list of candidate probe words;
   a description word counter that counts a number of item descriptions that contain the candidate probe words for each candidate probe word;
   a selection component for choosing q probe words whose word count is closest to $|D_i|/(q+1)$, where $D_i$ is a set of remaining item descriptions for an ith repetition, and q is a number of probe words presented for user selection and is an integer greater than 1;
   a presentation component for presenting a list of q probe words for selection by the user;
   a pruning component for eliminating non-selected ones of the q probe words and item descriptions associated with the non-selected ones of the q probe words to create a pruned list of candidate probe words, wherein the pruned list of candidate probe words includes a probe word selected by the user from the q probe words; and
   the candidate word component for generating a new list of candidate probe words from the pruned list of candidate probe words;
   wherein the candidate word component, description word counter, selection component, presentation component, and pruning component are executed by a processor communicatively coupled to a memory.

15. The computer hardware system for generating probe words recited in claim 14, wherein the candidate word component can optionally create a new list of candidate probe words from the remaining item descriptions, wherein the step of creating a new list of candidate probe words is performed after the pruning component eliminates previously chosen probe words and items associated with the probe words that were not selected.

16. The computer hardware system for generating probe words recited in claim 14, wherein the presentation component further presents a final list of item descriptions for user selection.

17. The computer hardware system for generating probe words recited in claim 14, wherein q subgroups are disjoint subgroups.

18. The computer hardware system for generating probe words recited in claim 14, wherein the item descriptions are capable of being changed with each repetition.

\* \* \* \* \*

UNITED STATES PATENT AND TRADEMARK OFFICE
CERTIFICATE OF CORRECTION

| | |
|---|---|
| PATENT NO. | : 8,688,728 B2 |
| APPLICATION NO. | : 13/406090 |
| DATED | : April 1, 2014 |
| INVENTOR(S) | : William K. Wilkinson |

It is certified that error appears in the above-identified patent and that said Letters Patent is hereby corrected as shown below:

In the Claims

In column 10, line 25, in Claim 12, delete "claim 8," and insert -- claim 7, --, therefor.

Signed and Sealed this
Fifteenth Day of July, 2014

Michelle K. Lee
*Deputy Director of the United States Patent and Trademark Office*